(12) United States Patent
Turnbull et al.

(10) Patent No.: US 7,429,075 B2
(45) Date of Patent: Sep. 30, 2008

(54) DRIVERS CAB FOR A LOAD-HANDLING VEHICLE

(75) Inventors: Kevin Turnbull, Dundalk (IE); Barry McGrane, Clogherhead (IE)

(73) Assignee: Moffett Research and Development Limited, Dundalk, County Louth (IE)

(*) Notice: Subject to any disclaimer, the term of this patent is extended or adjusted under 35 U.S.C. 154(b) by 280 days.

(21) Appl. No.: 11/195,861

(22) Filed: Aug. 3, 2005

(65) Prior Publication Data
US 2006/0028053 A1   Feb. 9, 2006

(30) Foreign Application Priority Data
Aug. 3, 2004   (IE) ............................... S2004/0522

(51) Int. Cl.
*B60J 7/00*   (2006.01)
(52) U.S. Cl. .............................. 296/190.11; 296/190.03; 296/146.11; 180/89.12
(58) Field of Classification Search ............ 296/146.11, 296/147, 190.03, 190.11; 280/748; 180/271, 180/89.12
See application file for complete search history.

(56) References Cited

U.S. PATENT DOCUMENTS 6,902,024 B2 * 6/2005 Miiller et al. ............... 180/271

* cited by examiner

*Primary Examiner*—Joseph D Pape
(74) *Attorney, Agent, or Firm*—Jacobson Holman PLLC

(57) ABSTRACT

There is provided an alternative construction of driver's cab (1) for a load-handling vehicle and in particular an alternative construction of door (5) for a driver's cab. The door (5) is pivotally mounted on one of the uprights (13) of the driver's cab (1) and does not protrude outwardly from the driver's cab when opened or closed. The door (5) is mounted so that it effectively pivots about its own substantially vertical plane. The door (5) is provided with a locking mechanism that allows the door to be secured in position relative the upright (13) without the need for additional locking members being mounted on another of the uprights (13) on the driver's cab. The construction of driver's cab is lightweight and compact and allows for a more simplified manufacture by virtue of the omission of additional components.

17 Claims, 5 Drawing Sheets

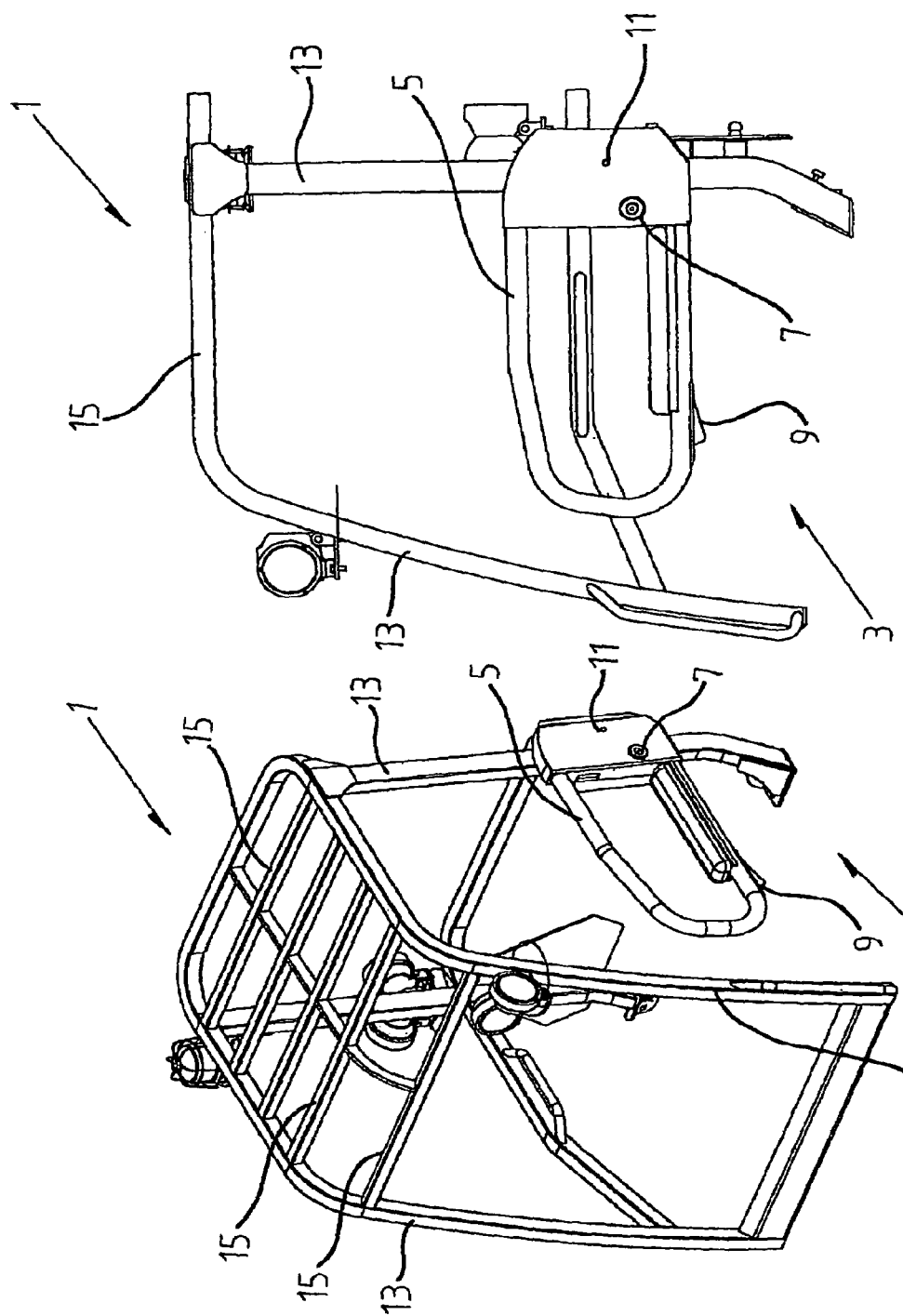

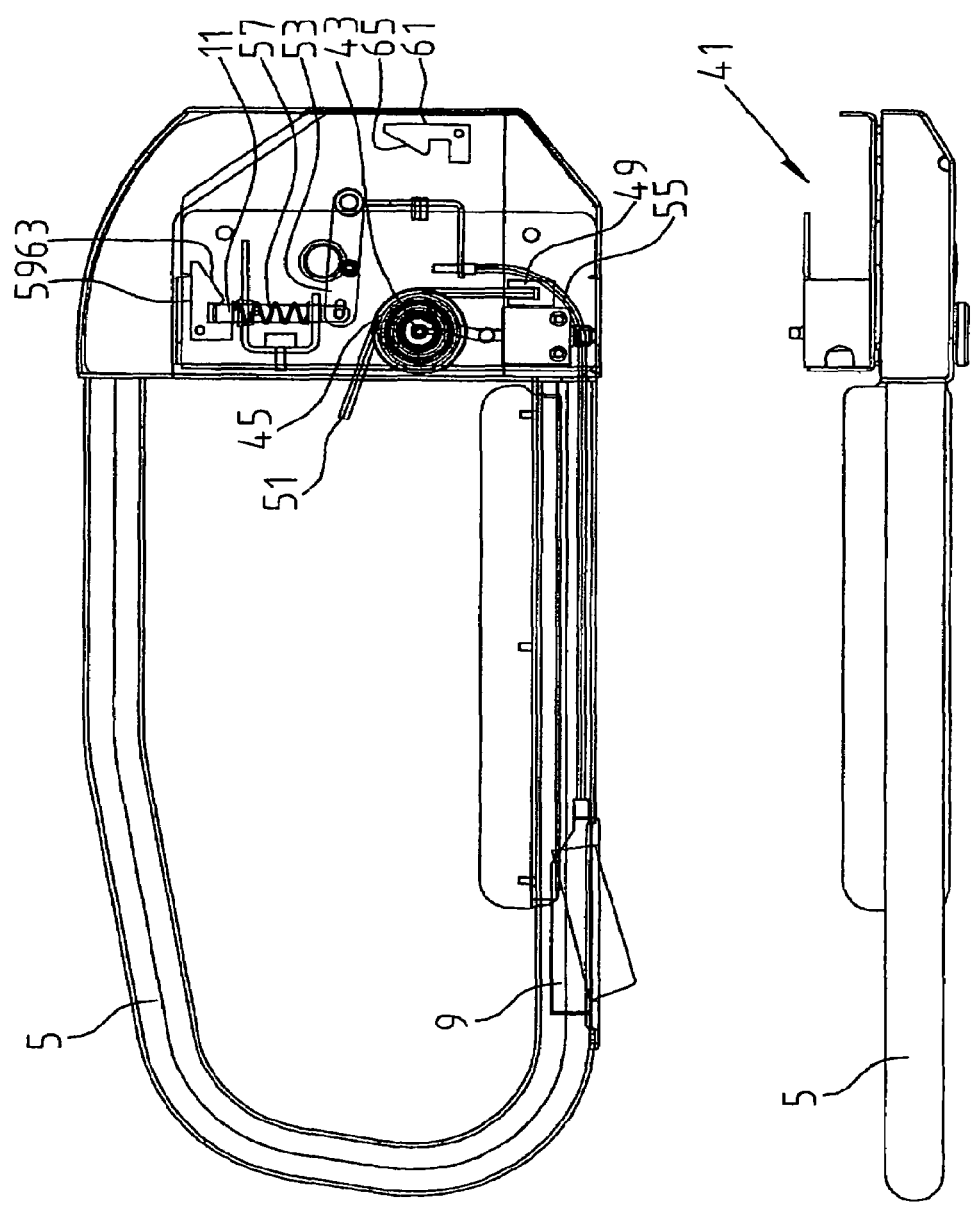

DRIVERS CAB FOR A LOAD-HANDLING VEHICLE

TECHNICAL FIELD OF THE INVENTION

This invention relates to a drivers cab for a load-handling vehicle comprising a cage-like structure having a plurality of uprights bridged at their upper ends by a roof structure, the drivers cab having an opening for providing access to and from the drivers cab and a door moveable to and from an open configuration free of the opening thereby permitting access to and from the drivers cab through the opening and a closed configuration substantially across the opening thereby preventing access to and from the drivers cab.

BACKGROUND OF THE INVENTION

Load-handling vehicles, including forklift trucks, piggyback forklift trucks and other similar type vehicles are commonly used throughout the world. These vehicles are generally used for the movement of goods in a factory or for the movement of materials about a site. Typically, these vehicles are provided with a driver's station, otherwise referred to as a driver's cab, which is positioned either centrally or to one side of the load-handling vehicle. These drivers' cabs typically comprise a roll cage having a plurality of uprights bridged at their upper ends by a roof structure which acts as a safety compartment for the driver of the vehicle. The drivers cab further comprises a door to prevent the driver of the vehicle from inadvertently falling from the vehicle when the vehicle is in operation. This is particularly necessary when the vehicle is being operated on uneven terrain such as on a building site or agricultural premises or when the vehicle is travelling at relatively high speeds when turning in a factory environment.

There are however problems associated with the known types of doors. Generally, these doors are mounted to the cab by way of hinges along one side of the door. Therefore, the door must swing outwardly away from the driver's cab when it is opened in order to allow access to and from the cab. When the door is in a fully open position, the door typically protrudes outwards from the drivers station to such an extent that there is a danger that personnel or other machinery could come into contact with the open door.

This often results in either significant damage to the door or the machinery and in certain situations this may result in injury to the personnel even when the vehicle is stationary. It has been known in the past for such load-handling vehicles to be operated with the door in an open position, either deliberately or accidentally, which has resulted in serious injury to individuals and machinery impacted by the open door.

One such door that is mounted onto an upright in this manner is described in U.S. Pat. No. 6,890,036. This patent describes a drivers cab having a door mounted onto a rear upright by way of a pair of hinges. The door is secured in a closed position by way of a locking bolt on the door which mates with a complimentary locking member on a front upright. An actuating element for releasing the locking bolt is mounted on top of the door. Another similar type of drivers cab is described in European Patent Application Publication No. EP 0992382 where there is shown a door that is pivotally connected to a rear upright by way of a hinge and is secured in place to a forward upright by way of a lock system. In order to gain access to or from either of these cabs, it is necessary to swing the door outwardly away from the vehicle about the hinge joints.

Another problem with the known types of door generally is that the doors, by their very nature, have a tendency to swing outwardly when a significant force is exerted on the door from within the driver's cab. It has been known for these doors to inadvertently open as a result of the driver being thrown against the door in the event of a high speed turn or an accident. Often, the driver's weight alone impacting against the door will be sufficient to cause the door to open and in other circumstances the driver will accidentally disengage the locking mechanism on the door as he or she is thrown against the door. It is at these times when the door is most needed that it is most likely to fail. Opening of the door in these circumstances has been known to result in serious injury to the drivers of the vehicle. This has resulted in the requirement for more and more elaborate and expensive locking mechanisms being provided with these doors. Typically, at least a portion of these elaborate locking mechanisms is mounted on an upright opposite the upright about which the door is mounted thereby requiring additional assembly which substantially increases the cost and complexity of manufacture of the vehicles.

One drivers cab for a load handling vehicle that does not describe a door that must pivot outwardly away from the vehicle in this manner is described in U.S. Pat. No. 4,392,660. This patent describes a safety bar that pivots upwardly across an opening in a drivers cab to prevent a driver from falling from the cab. This device describes a vertical member which is pivotally connected to hinge plates secured to the floor of a vehicle, and a horizontal member which is secured to the vertical member that blocks the opening. The horizontal member has a locking portion for reception in a latch bar on a forward upright in the drivers cab. Although this door will not pivot outwards when being opened, it requires a significant amount of space to be mounted on a vehicle and is only practical on the largest earthmoving machines and the like. This door would not be practical in smaller load-handling vehicles and in particular piggyback forklifts where space is at an absolute premium. A further disadvantage of this type of door is that it also requires a complimentary locking mechanism provided on an upright that entails additional manufacturing expense and complexity.

It is an object therefore of the present invention to provide a door for a load-handling vehicle that overcomes at least some of the above-identified problems that is both simple and cost efficient to manufacture. It is a further object of the present invention to provide a door for a load-handling vehicle that does not protrude away from the driver's cab by a significant distance and that is not prone to inadvertent opening on impact from within the driver's cab.

SUMMARY OF THE INVENTION

According to the invention there is provided a driver's cab for a load-handling vehicle comprising:

a cage-like structure having a plurality of uprights bridged at their upper ends by a roof structure, the cage-like structure defining an opening for providing access to and from the driver's cab; and a door moveable to and from an open configuration free of the opening thereby permitting access to and from the driver's cab through the opening and a closed configuration substantially across the opening thereby preventing access to and from the driver's cab, the door being pivotally mounted on one of the uprights about a substantially horizontal pivot axis normal to the main longitudinal axis of the upright about which it is mounted, so that the door moves about the pivot axis to and from an open and a closed configuration in the doors own substantially vertical plane.

In this way, by having a door that opens and closes by pivoting in its own substantially vertical plane, the door will no longer protrude outwardly from the vehicle when in an open position. The overall width of the machine will remain constant and the door will at no stage protrude outwardly from the vehicle. Therefore the door will present no danger to individuals and machinery in the vicinity of the vehicle whether the vehicle is stationary or moving. By pivoting in its own substantially vertical plane the door will furthermore not be inclined to move outwardly from the vehicle as a result of an impact from within the vehicle and will hold fast against any such impacts. This results in a more secure door for the operator of the vehicle. Furthermore, by mounting the door on one of the uprights, the door construction will be more compact and will require significantly less room on the vehicle than was previously the case and the door may be fitted onto practically any type of load handling vehicle including piggyback forklift trucks and the like. Finally, by mounting the door on one of the uprights, the door will also be easier to manufacture and valuable time will not be lost correctly positioning the door on the vehicle body.

In one embodiment of the invention there is provided a drivers cab in which the door is further provided with a releasable locking mechanism, the releasable locking mechanism being arranged to secure the door in position by releasably engaging the upright about which the door is pivotally mounted. This is seen as a particularly preferred aspect of the current invention. By having a locking mechanism that secures the door in position by releasably engaging the same upright about which the door is pivotally mounted, there will be no need for additional locking members to be mounted on a facing upright in order to secure the door in position. This saves considerable time and expense in the manufacture of the door as the positioning of the locking members is a time consuming and labour-intensive exercise. Furthermore, there will be less operating parts to the device making the construction simpler and less expensive than was previously possible. This is seen as a significant advantage over the previous devices.

In another embodiment of the invention there is provided a drivers cab in which the releasable locking mechanism further comprises a locking pin for bearing against the upright to prevent pivoting of the door and a handle connected to the locking pin, the locking pin being movable to and from a position bearing against the upright and a position free of the upright under operation of the handle. This is seen as a particularly simple construction that will be cost effective and simple to manufacture. The locking pin arrangement is reliable and is not prone to failure and by operating by simply bearing against the upright the device is extremely simple in construction and does not rely on intricate locking mechanisms to operate effectively.

In a further embodiment of the invention there is provided a drivers cab in which the handle is located on the underside of the door body portion. Alternatively, the handle may be located only on the exterior of the door body portion.

In another embodiment of the invention there is provided a drivers cab in which the upright upon which the door is pivotally mounted is provided with a plurality of spaced-apart locking pin receiving apertures, each of which being suitable for reception of the locking pin therein.

In a further embodiment of the invention there is provided a driver's cab in which the locking pin is spring loaded towards a position for bearing against an upright.

In one embodiment of the invention there is provided a drivers cab in which the releasable locking mechanism is arranged to secure the door in either an open configuration or a closed configuration at any one time.

In another embodiment of the invention there is provided a drivers cab in which there is provided a torsion spring to bias the door towards an open configuration. Instead of a torsion spring, it is envisaged that a gas strut may be used to bias the door towards an open configuration.

In a further embodiment of the present invention there is provided a driver's cab in which the door is pivotally mounted on a rear upright relative the normal direction of travel of the vehicle.

In another embodiment of the invention there is provided a piggyback forklift for mounting on the rear of a carrying vehicle comprising:—

- a unshaped chassis having a rear crossbar and a pair of side bars mounted at either end of the rear crossbar and projecting forwardly therefrom;
- an upright mast mounted on the chassis between the side bars;
- means for moving the upright mast forwards and backwards along the chassis between the side bars towards and away from the rear crossbar;
- lifting means mounted on the upright mast for carrying a load thereon;
- a motive power unit mounted on one side bar of the chassis;
- a driver's cab mounted on the other side bar of the chassis opposite the motive power unit, the driver's cab comprising a cage-like structure having a plurality of uprights bridged at their uppermost ends by a roof structure, the driver's cab defining an opening for providing access to and from the driver's cab; and
- a door moveable to and from an open configuration free of the opening thereby permitting access to and from the driver's cab through the opening and a closed configuration substantially across the opening thereby preventing access to and from the drivers cab, the door being pivotally mounted on one of the uprights about a substantially. horizontal pivot axis normal to the main longitudinal axis of the upright about which it is mounted, so that the door moves about the pivot axis to and from an open and a closed configuration in the doors own substantially vertical plane.

By having a piggyback forklift truck of this construction, the piggyback truck will remain lightweight and will not require additional heavy components to mount the door in position. This is essential in piggyback forklifts as any increase in weight of the piggyback forklift leads to a proportional decrease in the possible carrying weight of the carrying vehicle. The overall width of the piggyback forklift will remain constant and the door will at no stage protrude outwardly from the vehicle. Therefore the door will present no danger to individuals and machinery in the vicinity of the vehicle whether the vehicle is stationary or moving. This also results in a more secure door for the operator of the piggyback forklift. Furthermore, by mounting the door on one of the uprights, the door construction will be more compact and will require significantly less room on the vehicle than was previously the case. This is also essential in piggyback forklifts in particular as space on these machines is always at a premium due to the fact that these machines are necessarily compact and lightweight for travelling on the rear of a carrying vehicle. Finally, by mounting the door on one of the uprights, the door will also be easier to manufacture and valuable time will not be lost correctly positioning the door on the vehicle body. This saves significantly on the manufacturing cost of the piggyback forklift truck.

In a further embodiment of the invention there is provided a piggyback forklift in which the door is further provided with a releasable locking mechanism, the releasable locking mechanism being arranged to secure the door in position by releasably engaging the upright about which the door is pivotally mounted.

In one embodiment of the invention there is provided a piggyback forklift in which the releasable locking mechanism further comprises a locking pin for bearing against the upright to prevent pivoting of the door and a handle connected to the locking pin, the locking pin being movable to and from a position bearing against the upright and a position free of the upright under operation of the handle.

In another embodiment of the invention there is provided a piggyback forklift in which the handle is located on the underside of the door body portion. By having the handle on the underside of the door, the driver of the vehicle will not inadvertently deactivate the locking mechanism should they accidentally fall against the door. This is seen as particularly useful in piggyback forklifts because due to the absence of counterweights in piggyback forklifts, these vehicles have more of a tendency to tilt to one side or another during a high speed turn of the vehicle thereby increasing the possibility of the operator being thrown against the door if they should turn the vehicle too quickly. By having the handle in this position, the operator will not therefore be prone to inadvertently opening the door when they are thrown against the door.

In a further embodiment of the invention there is provided a piggyback forklift in which the upright upon which the door is pivotally mounted is provided with a plurality of spaced-apart locking pin receiving apertures, each of which being suitable for reception of the locking pin therein.

BRIEF DESCRIPTION OF THE DRAWINGS

The invention will now be more clearly understood from the following description of some embodiments thereof given by way of example only with reference to the accompanying drawings in which:

FIG. 1 is a perspective view of the driver's cab having a door according to the present invention in a closed position;

FIG. 2 is a left hand side view of the driver's cab with the door in a closed position;

FIG. 7 is an side cross sectional view of the door shown in FIG. 6; and

FIG. 8 is a top plan view of the door shown in FIG. 6.

DETAILED DESCRIPTION OF THE INVENTION

Figure 3:
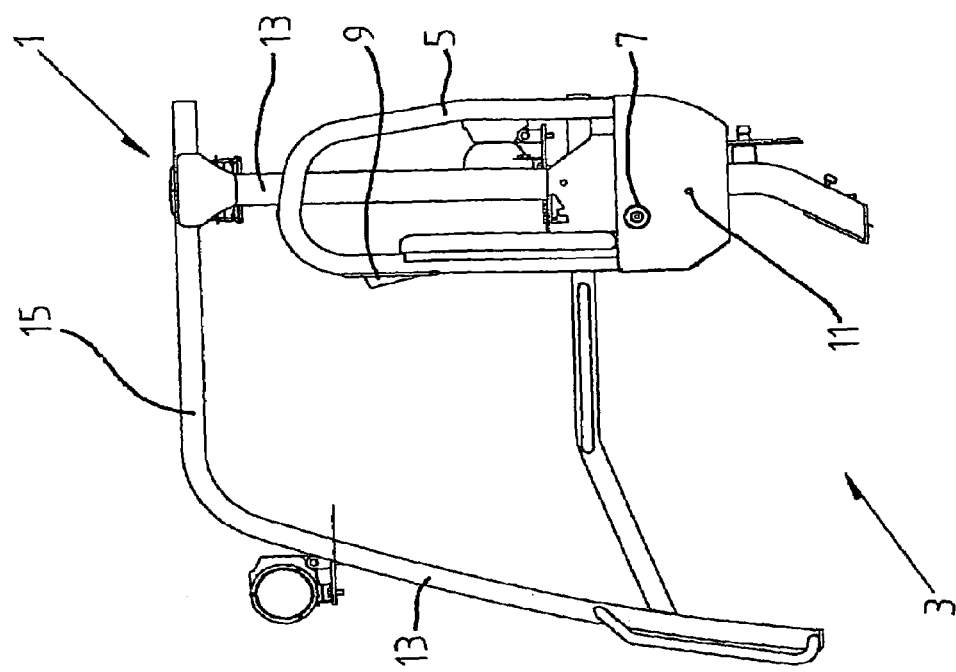
FIG. 3 is a perspective view of the driver's cab with the door according to the present invention in an open position.
Figure 4:
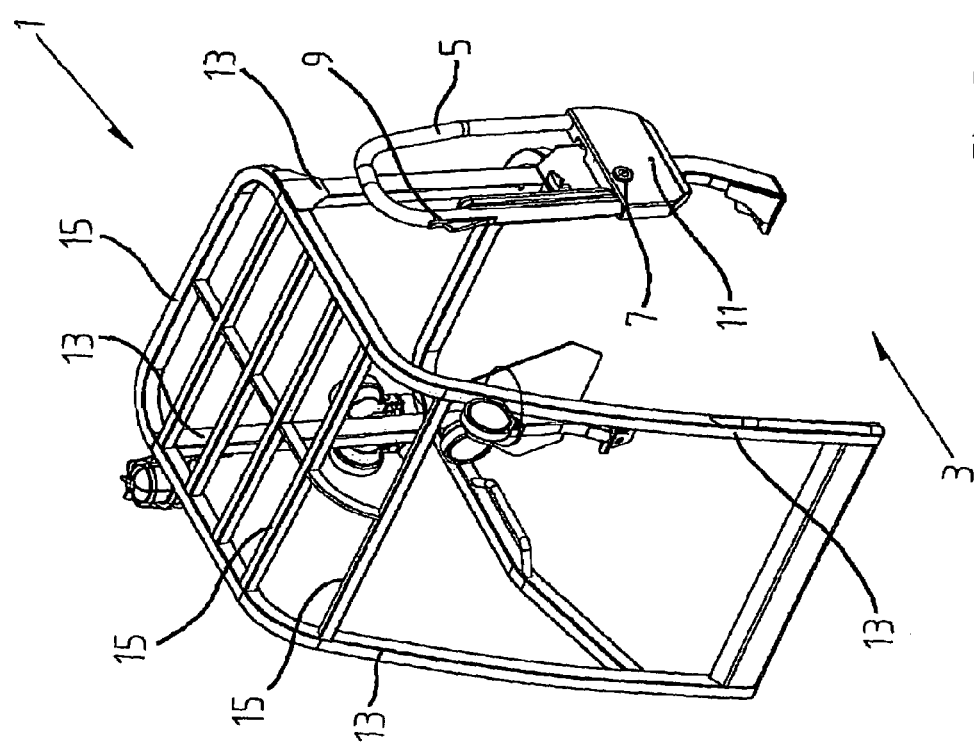
FIG. 4 is a left hand side view of a driver's cab with the door in an open position.

Referring to the drawings, and initially to FIGS. 1 to 4 inclusive, there is shown a driver's cab, indicated generally by the reference numeral 1, having an opening 3 to allow access to and from the cab and a door 5 mounted on the cab 1 and moveable to and from an open position in which the door is free of the opening (FIG. 3) and a closed position in which the door is across the opening (FIG. 1) thereby preventing access to or from the cab. The door 5 is pivotally mounted to the cab 1 about pivot pin 7 in such a manner so that the door pivots substantially in its own substantially vertical plane and does not protrude laterally outwardly from the cab when in an open position. Instead, the door pivots upwardly along its substantially vertical plane to the open position and remains in the same substantially vertical plane as in the closed position.

A locking mechanism comprising a release handle 9 and a locking pin 11 are provided on the door. The release handle 9 is operable to cause the locking pin 11 to move from a release position in which the locking pin 11 withdraws internal the door 5 and a locking position in which the locking pin 11 protrudes outwardly from the door 5 to bear against the cab 1 and prevent movement of the door 5. The release handle 9 is located on the underside of the door 5 to prevent inadvertent release of the locking mechanism. In this way, an operator of the vehicle, in order to alight from the vehicle, must first of all engage the release handle 9 and thereafter lift the door upwards from a closed position until it reaches an open position. Once in an open position the operator may let go of the release handle once more and the locking pin 11 will bear against the cab 1 thereby preventing the door 5 from pivoting downwards into a locking position. If the operator wishes to close the door 5, they simply engage the release handle 9 which in turn operates the locking pin 11 which withdraws into the door thereby allowing the door 5 to be pivoted downwards to a closed position. In a closed position the locking pin will bear against the cab once more. A biasing means, not shown, is provided to urge the door from a substantially horizontal closed position to an upright open position. The biasing means comprises a torsion spring which acts to rotate the door to an open vertical position. The torsion spring provides a smooth action and also forces the door to latch in an upright position. As an alternative to the torsion spring, a gas strut or other similar means may be used as the biasing means.

It is envisaged that instead of the locking pin 11 bearing directly against the cab, a pin receiving hole could be provided on the cab to receive the locking pin when the door is in either an open or a closed configuration. Alternatively, a pair of holes could be provided, one to receive the locking pin when the door is in a closed position and one to receive the locking pin when the door is in an open configuration. In another still embodiment, a plurality of pin receiving holes may be provided to allow for a degree of adjustability of the door so that it may be positioned relative the driver to suit the height of the driver operating the vehicle.

In the embodiment shown, the cab 1 is a framework structure comprising a plurality of uprights 13 bridged at their upper ends by a plurality of cross members 15. Therefore the cab is extremely lightweight and provides excellent visibility to the operator. Furthermore it can be seen that the door itself is also a framework construction made from a tubular frame which is both strong and lightweight. It is envisaged that instead of having the door pivotally mounted in the manner shown, the door could be hingedly mounted onto the cab. Furthermore, the door could be mounted on the rear upright or one of the front uprights and would operate in an adequate fashion. It is important to note that the door does not require additional fastening means to be provided on an additional upright other than the upright about which it is mounted. This is seen as a particularly advantageous feature that will allow for a more lightweight and less complex structure to be provided. Furthermore, considerable time and expense will be saved by not having to align the various locking components and position same on the frame of the drivers cab.

Figure 5:
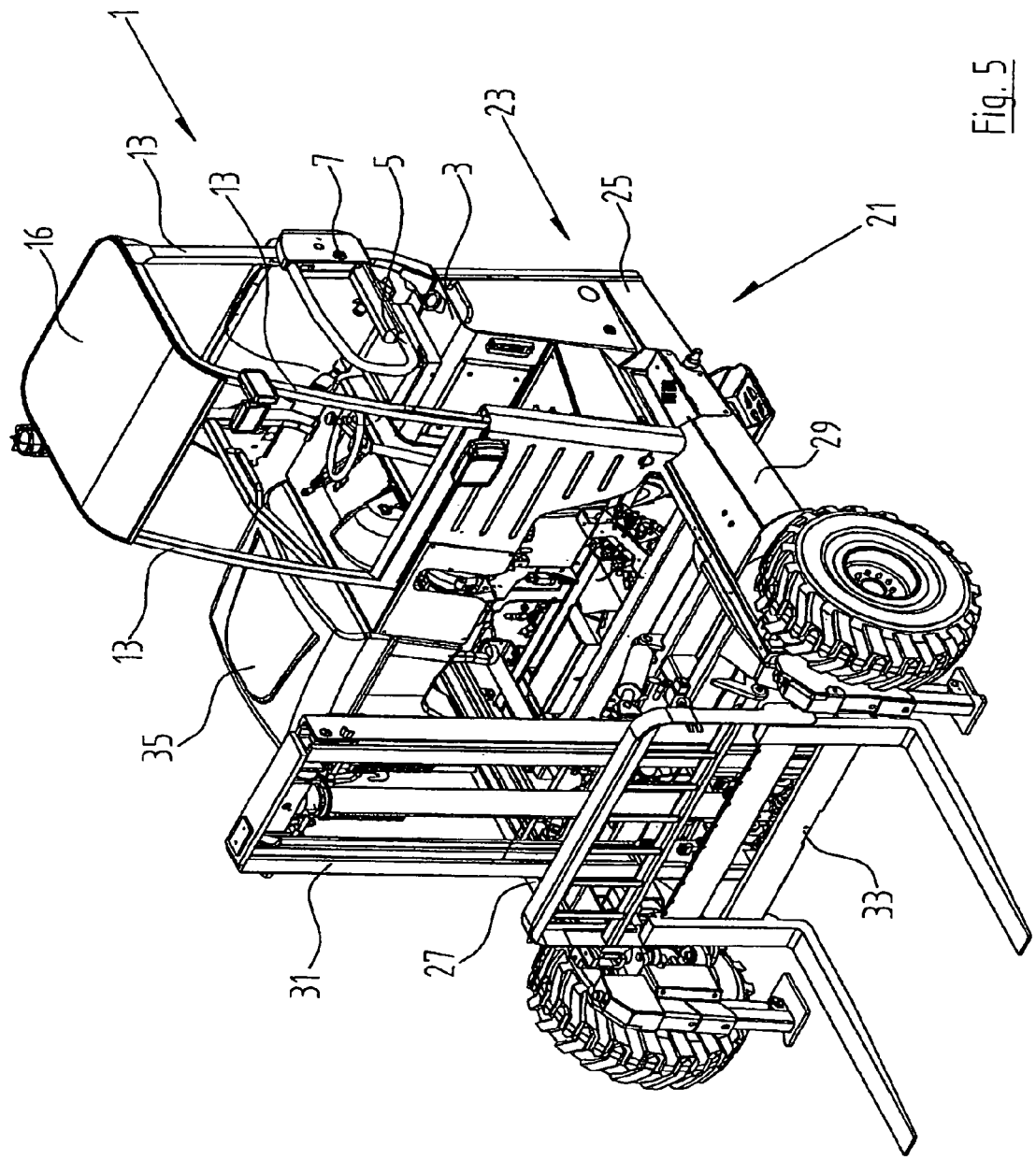
FIG. 5 is a perspective view of a piggyback forklift incorporating the driver's cab according to the present invention.

Referring now to FIG. 5 of the drawings there is shown a perspective view of a piggyback forklift truck, indicated generally by the reference numeral 21, incorporating the driver's cab 1 according to the present invention. The piggyback forklift 21 further comprises a u-shaped chassis 23 having a rear crossbar 25 and a pair of side bars 27, 29 mounted on either end of the rear cross bar and projecting forwardly therefrom. An upright mast 31, having lifting means 33 for carrying a load mounted thereon, is mounted on the chassis between the side bars 27, 29. There is further provided means for moving the upright mast forwards and backwards along the chassis between the side bars 27, 29 towards and away from the rear crossbar 25. A motive power unit 35 is mounted on one of the side bars 27 and a driver's cab 1 is mounted on the other side bar 29. The driver's cab comprises a cage-like structure having a plurality of uprights 13 bridged at their upper ends by a roof structure 16. The driver's cab defines an opening 3 for providing access to and from the driver's cab and there is provided a door 5 pivotally mounted on one of the uprights 13 about a substantially horizontal pivot axis 7. The substantially horizontal pivot axis 7 is normal to the main longitudinal axis of the upright about which it is mounted so that the door may move about the pivot axis 7, to and from an open configuration whereby access to the driver's cab is permitted and a closed configuration whereby access to the driver's cab is prevented, in it's own substantially vertical plane.

It can be seen that in this instance the roof structure 16 is provided by way of a solid roof. Alternatively, the roof structure could comprise a plurality of cross bars mounted adjacent the uppermost ends of each of the uprights 13. Similarly, an awning of a canvas type material or the like could be used if desired.

Figure 6:
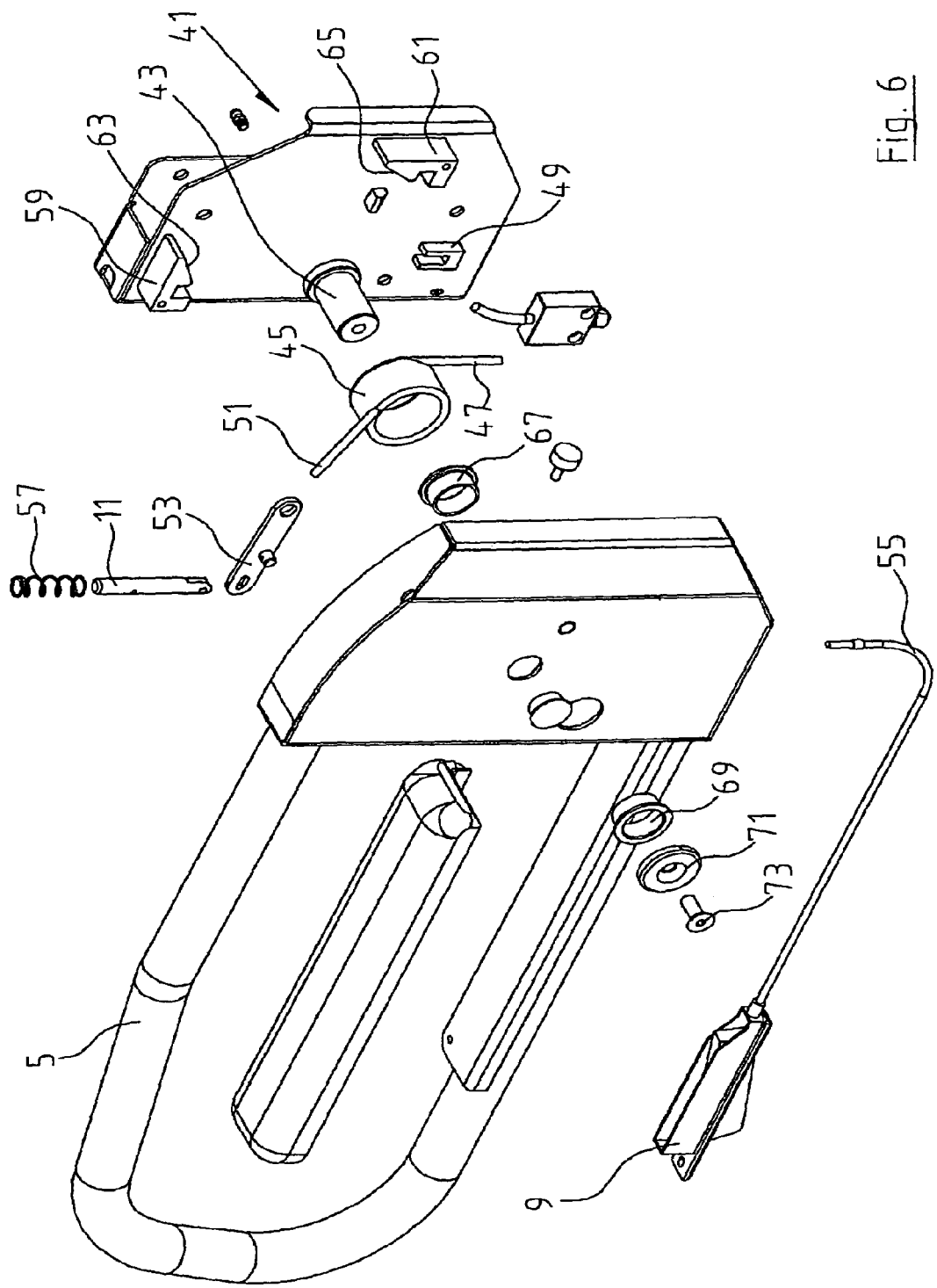
FIG. 6 is an exploded view of an alternative construction of door for use with the driver's cab according to the present invention.

Referring now to FIGS. 6 to 8 inclusive of the drawings there is shown an alternative construction of door for the driver's cab according to the present invention where like parts have been given the same reference numerals as before. The door 5 further comprises a mounting bracket 41 which may be attached to an upright (not shown) of a driver's cab. Once the mounting bracket 41 is secured in position by suitable fasteners (not shown) the door 5 is pivotally mounted about a pivot pin 43 on the mounting bracket 41. The pivot pin 43 forms a substantially horizontal pivot axis normal to the main longitudinal axis of the upright about which the door is secured. A torsion spring 45 is provided mounted around the pivot pin 43, one end 47 of the torsion spring is received in an anchoring groove 49 formed on the mounting bracket 41 and the other end 51 of the spring is allowed to bear against the body of the door. The door is further provided with an alternative construction of locking pin 11 and handle 9 arrangement. The handle 9 is connected to the locking pin 11 by way of an actuating mechanism. The actuating mechanism comprises a latch lever 53 pivotally mounted intermediate its ends on the door 5. One end of the latch lever 53 is connected to the locking pin 11 and the other end of the latch lever 53 is connected to the handle 9 via a connecting rod 55. A pair of anchorage grooves 59, 61 are formed on the mounting bracket 41 each being suitably dimensioned for reception of the locking pin 11 therein. A compression spring 57 is mounted on the locking pin 11 to urge the locking pin towards an anchorage groove to secure the locking pin therein.

In use, in order to move the door 5 from a substantially horizontal closed configuration to a substantially vertical open configuration, the operator of the vehicle (not shown) presses the handle 9 inwardly. This causes the connecting rod 55 to push against one end of the latch lever 53 causing the latch lever 53 to rotate about its pivot point. This in turn causes the locking pin 11 to disengage from the anchorage groove 59 against the force of the compression spring 57. Once the locking pin 11 has been moved to this position free of the anchorage groove 59, the door may be pivoted clockwise about the pivot pin 43 in the doors own substantially vertical plane until the locking pin 11 is aligned with the anchorage groove 61. Once the handle 9 had been pressed to disengage the locking pin, the torsion spring 45 acts to move the door 5 clockwise to a substantially vertical open configuration. When in position, the handle 9 may be released once again and the locking pin 11 will be caused to engage the anchorage groove 61 under the action of the compression spring 57. In order to return the door from a substantially vertical open configuration to a substantially horizontal closed configuration, the operator must once again press the handle 9 inwardly which causes the locking pin 11 to disengage from the anchorage groove 61. With the locking pin 11 in this position, the door may be pivoted anticlockwise about pivot pin 43 until the locking pin 11 is aligned with the anchorage groove 59 once more where it is allowed to engage the anchorage groove 59 and hold the door in a substantially horizontal closed configuration.

It will be understood that the anchorage grooves 59 and 61 are so dimensioned that the handle 9 does not have to remain pressed inwardly at all times when pivoting the door 5. The anchorage grooves 59 and 61 each have a sloped surface 63, 65 respectively, to cause the locking pin 11 to gradually move inwardly as it approaches and contacts the anchorage groove. Therefore, the handle 9 may be released once the locking pin 11 is disengaged from either anchorage groove 59, 61 and moved out of line with that anchorage groove 59, 61. It will be further understood that depending on the orientation of the spring 45, the spring 45 may be used to bias the door 5 towards either a substantially vertical open configuration or a substantially horizontal closed configuration. Finally, various flanged bushes 67, 69, fixing plates 71 and connectors 73 are provided to secure the door 5 in place on the mounting bracket 41, the operation of which would be readily understood by one skilled in the art and it is felt that no further explanation of these components is deemed necessary.

In this specification the terms "comprise, comprises, comprised and comprising" and the terms "include, includes, included and including" are deemed totally interchangeable and should be afforded the widest possible interpretation.

The invention is in no way limited to the embodiments hereinbefore described but may be varied in both construction and detail within the scope of the claims.

The invention claimed is:

1. A driver's cab for a load-handling vehicle comprising:
   a cage-like structure having a plurality of uprights bridged at their upper ends by a roof structure, the cage-like structure defining an opening for providing access to and from the driver's cab;
   a door moveable to and from an open configuration free of the opening thereby permitting access to and from the driver's cab through the opening and a closed configuration substantially across the opening thereby preventing access to and from the driver's cab, the door being pivotally mounted on one of the uprights about a substantially horizontal pivot axis normal to the main longitudinal axis of the upright about which it is mounted, so that the door moves about the pivot axis to and from an open and a closed configuration in the doors own substantially vertical plane; and
   the door is further provided with a releasable locking mechanism, the releasable locking mechanism being arranged to secure the door in position by releasably engaging the upright about which the door is pivotally mounted.

2. The driver's cab as claimed in claim 1 in which the releasable locking mechanism further comprises a locking pin for bearing against the upright about which the door is pivotally mounted to prevent pivoting of the door and a handle connected to the locking pin, the locking pin being movable to and from a position bearing against the upright about which the door is pivotally mounted and a position free of the upright about which the door is pivotally mounted under operation of the handle.

3. The driver's cab as claimed in claim 2 in which the handle is located on the underside of the door.

4. The drivers's cab as claimed in claim 2 in which the upright upon which the door is pivotally mounted defines a plurality of spaced-apart locking pin receiving apertures, each of the locking pin receiving apertures being suitable for reception of the locking pin therein.

5. The driver's cab as claimed in claim 2 in which the locking pin is spring loaded towards a position for bearing against an the upright about which the door is pivotally mounted.

6. The driver's cab as claimed in claim 1 in which the releasable locking mechanism is arranged to secure the door in either one of an open configuration or a closed configuration at any one time.

7. The driver's cab as claimed in claim 1 in which there is provided a torsion spring to bias the door towards an open configuration.

8. The driver's cab as claimed in claim 1 in which there is provided a gas strut to bias the door towards an open configuration.

9. The driver's cab as claimed in claim 1 in which the door is pivotally mounted on a rear upright relative the normal direction of travel of the load-handling vehicle.

10. The driver's cab as claimed in claim 1 in which the driver's cab further comprises a mounting bracket secured to an upright, the mounting bracket having a pivot pin about which the door is pivotally mounted so that the door moves about the pivot pin to and from an open and a closed configuration in its own substantially vertical plane.

11. The driver's cab as claimed in claim 10 in which the mounting bracket is provided with a plurality of anchorage grooves for reception of a locking pin therein.

12. A piggyback forklift for mounting on the rear of a carrying vehicle comprising:
a u-shaped chassis having a rear crossbar and a pair of side bars mounted at either end of the rear crossbar and projecting forwardly therefrom;
an upright mast mounted on the chassis between the side bars;
means for moving the upright mast forwards and backwards along the chassis between the side bars towards and away from the rear crossbar;
lifting means mounted on the upright mast for carrying a load thereon;
a motive power unit mounted on one side bar of the chassis;
a driver's cab mounted on the other side bar of the chassis opposite the motive power unit, the driver's cab comprising a cage-like structure having a plurality of uprights bridged at their uppermost ends by a roof structure, the driver's cab defining an opening for providing access to and from the driver's cab; and
a door moveable to and from an open configuration free of the opening thereby permitting access to and from the driver's cab through the opening and a closed configuration substantially across the opening thereby preventing access to and from the drivers cab, the door being pivotally mounted on one of the uprights about a substantially horizontal pivot axis normal to the main longitudinal axis of the upright about which it is mounted, so that the door moves about the pivot axis to and from an open and a closed configuration in the doors own substantially vertical plane; and
in which the door is further provided with a releasable locking mechanism, the releasable locking mechanism being arranged to secure the door in position by releasably engaging the upright about which the door is pivotally mounted.

13. The piggyback forklift as claimed in claim 12 in which the releasable locking mechanism further comprises a locking pin for bearing against the upright about which the door is pivotally mounted to prevent pivoting of the door and a handle connected to the locking pin, the locking pin being movable to and from a position bearing against the upright about which the door is pivotally mounted and a position free of the upright about which the door is pivotally mounted under operation of the handle.

14. The piggyback forklift as claimed in claim 13 in which the handle is located on the underside of the door.

15. The piggyback forklift as claimed in claim 13 in which the upright upon which the door is pivotally mounted is provided with a plurality of spaced-apart locking pin receiving apertures for reception of the locking pin therein.

16. The piggyback forklift as claimed in claim 12 in which the driver's cab further comprises a mounting bracket secured to an upright, the mounting bracket having a pivot pin about which the door is pivotally mounted so that the door moves about the pivot pin to and from an open and a closed configuration in its own substantially vertical plane.

17. The piggyback forklift as claimed in claim 16 in which the mounting bracket is provided with a plurality of anchorage grooves for reception of a locking pin therein.

* * * * *